(12) United States Patent
Janky et al.

(10) Patent No.: US 7,263,441 B1
(45) Date of Patent: *Aug. 28, 2007

(54) METHOD AND SYSTEM FOR CONTROLLING AN ELECTRONIC DEVICE

(75) Inventors: Gregory T. Janky, Sammamish, WA (US); Dennis Workman, Morgan Hill, CA (US); Ami Bergstrom, Morgan Hill, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 10/921,609

(22) Filed: Aug. 18, 2004

(51) Int. Cl.
*G01C 21/26* (2006.01)

(52) U.S. Cl. .................... 701/213; 340/989; 701/208; 701/207

(58) Field of Classification Search ............... 701/207, 701/213, 208, 209, 21; 340/989, 992; 342/357.01, 342/357.06, 457; 455/456.1, 456.6
See application file for complete search history.

(56) References Cited

U.S. PATENT DOCUMENTS

| | | | |
|---|---|---|---|
| 5,650,770 A | 7/1997 | Schlager et al. | |
| 6,356,196 B1 | 3/2002 | Wong et al. | |
| 6,362,736 B1 | 3/2002 | Gehlot | |
| 6,506,049 B2 * | 1/2003 | Hanson | 433/11 |
| 6,512,465 B2 * | 1/2003 | Flick | 340/989 |
| 6,609,064 B1 * | 8/2003 | Dean | 701/213 |
| 6,657,587 B1 * | 12/2003 | Mohan | 342/357.1 |
| 6,658,349 B2 * | 12/2003 | Cline | 701/207 |
| 6,801,853 B2 * | 10/2004 | Workman | 701/213 |
| 6,804,602 B2 * | 10/2004 | Impson et al. | 701/117 |
| 2004/0034470 A1 | 2/2004 | Workman | |

FOREIGN PATENT DOCUMENTS

| | | |
|---|---|---|
| GB | 2 373 086 | 9/2002 |
| WO | WO 2004/017272 | 2/2004 |

\* cited by examiner

*Primary Examiner*—Richard M. Camby

(57) ABSTRACT

The present invention is a method and system for controlling an electronic device. In one embodiment, a controller is coupled with a position determining component, and a motion detecting component. In one embodiment, the motion detecting component detects motion of the electronic device and generates a signal to the controller indicating the motion. The controller, in response to the signal, causes the position determining component to determine the geographic location of the electronic device. The geographic location is compared with a pre-defined zone and, in response to the comparing, a command is generated for controlling the electronic device.

26 Claims, 5 Drawing Sheets

METHOD AND SYSTEM FOR CONTROLLING AN ELECTRONIC DEVICE

RELATED APPLICATIONS

The present invention benefits from U.S.P.T.O. application Ser. No. 10/222,532 filed Aug. 15, 2002 now U.S. Pat. No. 6,801,853 titled A Portable Motion-Activated Position Reporting Device by Dennis Workman, assigned to the assignee of the present invention, and which is hereby incorporated by reference in its entirety herein, now U.S. Pat. No. 7,050,907 and U.S.P.T.O. application Ser. No. 10/392,995, filed Mar. 19, 2003, titled A Method and System for Controlling an Electronic Device, by Janky et al., assigned to the assignee of the present invention, and which is hereby incorporated by reference in its entirety herein.

FIELD OF THE INVENTION

Embodiments of the present invention are related to a device for determining and reporting the position of a person or object, and for providing control information.

BACKGROUND OF THE INVENTION

Position reporting devices are frequently used to locate and report the position of a person or object. A typical position reporting device combines a navigation system such as the Global Positioning System (GPS) module with a mobile communications system such as a cellular modem to determine the position or geographic location of a person or asset being tracked and report their position to a tracking facility. Position reporting devices are used in a variety of systems in which timely position information is required such as fleet tracking and asset recovery systems.

Fleet tracking systems allow a user to monitor the position of a ship or vehicle carrying a position reporting device by sending a succession of position fixes. The phrase "position fix" refers to a process of determining an unknown location using a fixed reference point or points. For example, the course of a vehicle being tracked can be inferred using successive position fixes sent by the position reporting device. In a similar manner it can be inferred that the vehicle is not moving when successive position fixes report the same position. Fleet tracking systems are commonly used by delivery services for routing and dispatching of vehicles. Asset recovery systems report the position of stolen or missing property (e.g., a stolen car) to a service provider or to the police in order to facilitate recovering the property.

However, many potential users find the cost of position reporting devices prohibitive compared to the value of the asset being tracked. Many position reporting devices have a manufacturing cost in the range of $200–$300 and a market price in the range of $500–$600. Thus, the use of position reporting devices has typically been limited to high value items such as cars or other vehicles.

Another drawback associated with position reporting devices is the amount of power they consume. While battery powered position reporting devices do exist, the amount of power they consume when turned on necessitates frequent battery changes in order to continue operating. This makes using position reporting devices inconvenient to some users in that they require an excessive amount of maintenance to continue operating.

Recently, concerns have been communicated regarding the operation of various electronic devices in certain environments. For example, airlines request that passengers refrain from using cellular telephones and laptop computers during takeoffs and landings because they can cause electromagnetic interference that can impair the operation of navigational and other instrumentation systems aboard airplanes. Since July of 2001, the Pentagon has had a moratorium on the construction of additional wireless communications networks, and bars connections to classified networks or computers using devices that are not explicitly approved by the Department of Defense. This is to prevent the unintentional compromise of secure data and includes personal wireless devices such as pagers, Personal Data Assistants (PDAs), and wireless e-mail devices. As another example, many public facilities such as theaters and restaurants now request that their patrons turn off their wireless devices (e.g., cellular telephones and pagers) while on their premises.

SUMMARY OF THE INVENTION

Accordingly, a need exists for a low-cost portable position determining and/or reporting device which is small enough to be easily concealed upon an asset which is being tracked. While meeting the above need, a further need exists for a method for reducing the power consumption of the above stated device. Additionally, while meeting the above stated needs, it would be advantageous to provide a device which can trigger another electrical device to perform a particular task upon entering or leaving a designated location zone.

The present invention is a method and system for controlling an electrical device. In one embodiment, a controller is coupled with a position determining component, a wireless communications component, and a motion detecting component. In one embodiment, the motion detecting component detects movement of the electronic device and generates a signal to the controller indicating the movement. The controller, in response to the signal, activates the position determining and/or reporting device to determine the geographic location of the electronic device. In one embodiment, the controller compares the geographic location of the electronic device with a pre-defined zone and generates a command for controlling the electronic device based upon the comparison.

Embodiments of the present invention can be used to cause an electronic device to perform a particular task upon entering or leaving a designated zone. For example, the present invention can be used to automatically inactivate the electronic device (e.g., a cellular telephone) when it is brought into a restricted area. This may include theaters, airports, hospitals, gas stations, or other areas where operating the electronic device may cause, for example, unwanted electromagnetic interference with other equipment in the area. A user can designate these areas to reduce the possibility of the user forgetting to shut down the device. In another embodiment, the user can accept a pre-packaged list of such exclusion zones for automatic implementation of this shut-off feature.

Similarly, the present invention can be used to cause an electronic device to perform a particular task when it is moved outside of a designated zone. Thus, when a user leaves a theater, hospital, or airport, the present invention can cause the electronic device to be automatically activated. As an example, a user's cellular telephone can be activated when the user moves outside of a theater.

In another embodiment, the present invention can be used as a theft deterrent. For example, if a laptop computer is moved outside of a zone designated by the owner, the present invention may cause the computer to sound an alarm, send a notification to a security service provider, or contact the owner of the computer (e.g., contacting the owner via a pager, cellular phone, or e-mail message).

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Figure 1:
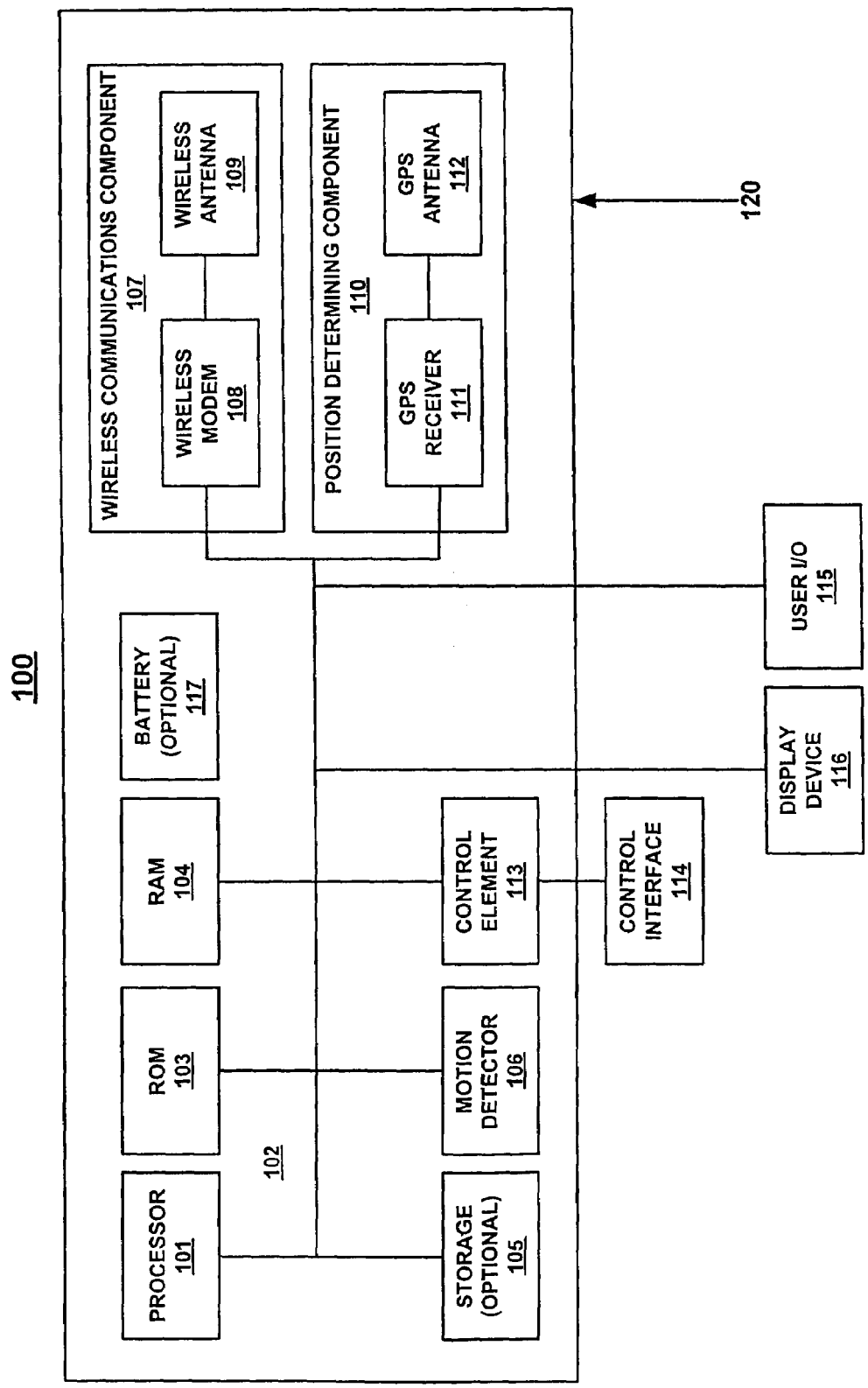
FIG. 1 is a block diagram of an exemplary initiating component in accordance with embodiments of the present invention.

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Embodiments of the present invention pertain to a method and system for controlling an electronic device. Embodiments of the present invention may be used to monitor the position of an electronic device and to generate commands for causing the device to automatically perform a designated action based upon its geographic location. Embodiments of the present invention can also be used to detect and report unauthorized movement of the electronic device and to assist in recovering it when unauthorized movement occurs.

Embodiments of the present invention comprise an initiating component disposed in an electronic device. The initiating component utilizes a motion detecting component to detect movement of the electronic device and sends a signal to a controller. In response to receiving this signal, the controller initiates a position determining component to determine the geographic location of the electronic device. This extends the battery life of the electronic device because the initiating component draws a minimal amount of power until movement of the device is detected. In one embodiment, the geographic location is compared with the coordinates of a zone of interest to the user. Depending upon what zone the electronic device is in, the controller generates a command for causing the electronic device to perform a specific action.

Embodiments of the present invention utilize a geo-fencing system in which a set of position coordinates are provided which define a pre-defined zone. In embodiments of the present invention, upon entering or leaving a pre-defined zone, a command is generated for causing the electronic device to perform a particular task. For example, the present invention can be configured to automatically shut down the electronic device when a particular zone is entered and to automatically activate the electronic device when that zone is left. In another embodiment, the position coordinates define a zone in which the asset can be moved without triggering an alarm. When the electronic device is moved outside of that zone, it sounds an audible alarm until inactivated. Alternatively, a wireless message can be sent to a monitoring service that notifies the owner of the device and/or law enforcement agencies in order to facilitate recovering the electronic device.

An example of a geo-fencing system is described in U.S. Pat. No. 5,751,245 titled Vehicle Route and Schedule Exception Reporting System by James Janky, Eric Klein, and John Schipper, assigned to Trimble Navigation Ltd. of Sunnyvale Calif., and incorporated as reference herein in its entirety.

In FIG. 1, initiating component 100 comprises a processor 101 coupled with an address/data bus 102. Processor 101 is for processing digital information and instructions and bus 102 is for conveying digital information between the various components of initiating component 100. Also coupled with bus 102 is a non-volatile read only memory (ROM) 103 for storing information and instructions of a more permanent nature volatile, and a random access memory (RAM) 104 for storing the digital information and instructions of a more volatile nature. In addition, initiating component 100 may optionally include a data storage device 105 for storing vast amounts of data.

In embodiments of the present invention, data storage device 105 may comprise a removable storage medium such as a smart card or an optical data storage device. Alternatively, data storage device 105 may comprise a programmable data storage device such as a flash memory device to facilitate quickly updating data. It should be noted that instructions for processor 101 as well as position coordinates which define a pre-defined zone can be stored either in volatile memory 104, data storage device 105, or in an external storage device (not shown). Similarly, previously determined geographic locations of initiating component 100, previously sampled GPS signals can be stored either in volatile memory 104, data storage device 105, or in an external storage device. Configuration data for determining what action should be initiated depending upon the current time and/or location of initiating component 100 can also be stored either in volatile memory 104, data storage device 105, or in an external storage device.

Initiating component further comprises a motion detector 106 coupled with bus 102 for detecting changes in the motion state of initiating component 100. In one embodiment, motion detector 106 detects the vibration associated with the movement of initiating component 100 and indicates this movement to processor 101 when changes in the vibration of initiating component 100 are detected. In other embodiments of the present invention, motion detector 106 may be an acceleration sensor, a tilt sensor, a rotation sensor, a gyroscope, etc. However, while the present embodiment recites these particular implementations of motion detector 106, the present invention is well suited to utilize a variety of devices for detecting movement of initiating component 100 and for indicating this movement to processor 101. In accordance with embodiments of the present invention, motion detector 106 detects when initiating component 100 transitions from a substantially stationary state to a moving state. Motion detector 106 can also detect when initiating component 100 transitions from a moving state to a substantially stationary state and/or changes in the rate of movement of initiating component 100. Thus, in embodiments of the present invention, motion detector 106 detects changes in the state of motion of initiating component 100 such as starting or stopping of motion, as well as acceleration/deceleration and generates an interrupt to processor 101. In response to these changes in motion, an interrupt is generated by motion detector 106. In response to an interrupt from motion detector 106, processor 101 changes the operating state of initiating component 100 from an idle operating state, in which a few components of initiating component 100 (e.g., wireless communications component 107 and position determining component 110) draw a minimal amount of power, to an active operating state in which these initiating component draw additional power.

Returning to FIG. 1, a wireless communications component 107, comprising a wireless modem 108 and a wireless antenna 109, is coupled with bus 102. A position determining component 110, comprising a GPS receiver 111 and a GPS antenna 112, is coupled with bus 102.

Wireless communications component 107 is for transmitting and receiving wireless messages (e.g., data and/or commands). In one embodiment, wireless communications component 107 is comprised of a cellular wireless antenna 109 and a cellular wireless modem 108. In one embodiment, initiating component 100 sends and receives messages using the Short Message Service (SMS). However, the present invention is well suited to utilize other message formats as well. In other embodiments of the present invention, wireless communications component 107 may comprise a Bluetooth wireless communications device, or another wireless communications device such as a Wi-Fi transceiver. Wi-Fi transceivers are often used to create local area networks between a portable computer and an Internet access point in public areas such as airports, coffee shops, libraries, and the like.

Position determining system 110 is for determining the location initiating component 100. In embodiments of the present invention, position determining component 110 comprises a GPS antenna 112 and a GPS receiver 111. However, while the present embodiment specifically recites a GPS position determining system, embodiments of the present invention are well suited to utilize a variety of terrestrial-based and satellite-based position determining systems as well.

In FIG. 1, a control element 113 is coupled with bus 102 and is for generating a control signal via control interface 114 depending upon the current time and/or location of initiating component 100.

Devices which are optionally coupled to initiating component 100 include a display device 116 for displaying information to a use. Display device 116 may be a liquid crystal device, cathode ray tube, a field emission display, or other display device suitable for creating graphic images and alpha-numeric characters recognizable to a user. A user input device 115 may also be coupled with bus 102 in embodiments of the present invention. In embodiments of the present invention, user input device 115 may comprise a keyboard, and a cursor control device (e.g., a mouse, trackball, light pen, touch pad, joystick etc.), for inputting data, selections, updates, and controlling initiating component 100. Initiating component 100 may optionally include a battery 117 for providing power for initiating component 100. While the present embodiment recites a battery powered device, the present invention is well suited to be electrically coupled with the device it is controlling and for drawing power from that device. For example, if initiating component 100 is disposed within a laptop computer, it may draw power from the laptop computer itself.

In embodiments of the present invention, components of initiating component 100 may be disposed upon a printed circuit board 120 such as a Personal Computer Memory Card Industry Association (PCMCIA) card, etc. This allows embodiments of the present invention to be used in a variety of electronic devices such as cellular telephones, laptop computers, personal digital assistants (PDAs), automotive electrical systems, and the like. However, in other implementations of the present invention, initiating component 100 may be a stand alone device that is used to control another device. For example, initiating component 100 may be installed in an automobile and used to initiate an action depending upon the location of the automobile. Thus, the components comprising initiating component 100 may be disposed within a housing.

It is appreciated that some of the components recited in the above discussion may be omitted in embodiments of the present invention. For example, when initiating component is disposed within a laptop computer, or a PDA, display device 116 and user input device 115 may be redundant and therefore omitted to reduce the cost of initiating component 100. In other implementations of the present invention, initiating component 100 may be disposed in an electronic device already having a wireless communications capability (e.g., a cellular telephone). Thus, wireless communications component 107 may be omitted embodiments of the present invention in order to reduce the cost of initiating component 100. Additionally, control element 113 may be omitted in embodiments of the present invention. For example, a control signal may be generated by processor 101 via control interface 114 for controlling an electronic device.

In embodiments of the present invention, when motion detector 106 detects movement of initiating component 100, it generates an interrupt signal to processor 101. In response to the interrupt signal, processor 101 activates other components of initiating component 100 such as wireless communications component 107 and position determining component 110. The geographic location of initiating component 100 is then determined using position determining component 110. Processor 101 compares the present geographic location with geographic coordinates that define a pre-defined zone. The coordinates of the pre-defined zone may reside in RAM 104 or in storage device 105. Based upon this comparison, processor 101 causes control element 113 to generate a command for controlling the electronic device in which initiating component 100 resides.

Alternatively, processor 101 may generate the command for controlling the electronic device itself. For example, initiating component 100 may be configured to generate a command causing the electronic device to become inactivated when it enters a restricted zone such as an theater, or the gangway leading from the departure lounge to the aircraft while boarding. Since the unit is programmed to operate autonomously to perform this shutdown function, it will work for items which are stored in luggage as well, performing another valuable service by ceasing battery drain while located in an unusable space. When the electronic device moves outside of the restricted zone, processor 101 may generate a signal causing the electronic device to become activated again. This is a great convenience to users who may forget to turn off their electronic devices when they enter a restricted area or to turn them back on when they leave the restricted area.

In embodiments of the present invention, storage device 105 stores a database of geographic coordinates which can define a plurality of pre-defined zones and associated commands that are to be generated by processor 101 depending upon whether the electronic device is inside of or outside of a pre-defined zone. Additionally, the geographic coordinates can define a route or plurality of routes. If the electronic device deviates from a specified route processor 101 can generate commands to the electronic device. For example, processor 101 can cause the electronic device to sound an alarm or other noise as a theft deterrent if the device is removed from a specified zone. Alternatively, processor 101 can initiate sending a message via wireless communications device 103 notifying the owner of the electronic device that it has left a specified zone, or notify police or other agencies. Additionally, processor 101 can initiate continuous location updates to assist in recovering the electronic device if it has been stolen.

The geographic location or route information used to determine what action should be initiated by the present invention may further be modified using temporal information. For example, if initiating component is disposed within an automobile, time parameters may be used in conjunction with location parameters to determine what action should be initiated by the present invention. Thus, a user could designate his or her typical route used when commuting to work and the hours when the automobile is permitted to be within that route. If the automobile is stolen, even if it is at a geographic location within the pre-defined boundaries of the commuting route, initiating component 100 may generate a control signal because it is at that location at the wrong time of the day.

Initiating component 100 may initiate generating a message conveying that the automobile has been stolen as described above, or may in some manner disable the automobile to prevent further movement of the automobile. For example, initiating component 100 may be coupled with the ignition system or the computer of the automobile. After determining that unauthorized movement of the automobile has occurred, initiating component 100 may generate a control signal to disable the automobile's engine the next time motion detector 106 determines that the car has stopped moving. This is so that initiating component 100 does not disable the automobile, for example, in the middle of a highway which may endanger other commuters. An initiating device lacking the motion detector of the present invention would not be able to perform in this manner, and may provide a less flexible or responsive solution to some situations addressed by the present invention.

Utilizing a motion detector with a position determining device is seemingly counter-intuitive or at least redundant in the current position reporting environment which relies upon successive position fixes to imply movement of the reporting device. For example, receiving a series of position reports which come from different locations implies that the initiating device is in motion. Alternatively, receiving a series of position reports which come from the same location implies that the initiating device is stationary. Therefore, it was considered redundant to incorporate a motion-detecting component into a device which already had an implied function of detecting motion.

However, providing initiating component 100 with motion detector 106 is advantageous because it reduces the amount of time that components of initiating component 100 are activated in order to determine a geographic location and thus extends the battery life of the electronic device with which initiating component 100 is coupled. In prior art initiating devices, determining whether the device was moving or stationary depended upon determining and comparing successive position fixes. If successive position fixes were from the same location, it was inferred that the device was stationary. If successive position fixes were from different locations, it was inferred that the device was in motion. These position fixes had to be provided at a regular interval in order to provide timely notification that the device was being moved. However, providing successive position fixes for a device which has not moved is an unnecessary drain of battery power, especially when the device remains stationary for extended periods of time. This in turn is burdensome to users of the device who are required to frequently replace the batteries of the electronic device in which initiating component 100 is disposed or to couple the electronic device to an external power source.

In embodiments of the present invention, storage device 105 may also store previously determined geographic positions of initiating component 100 and/or previously sampled GPS signals. This aids signal acquisition in environments where a clear path to the satellites is either partially or totally obscured, as inside a building. In some GPS implementations, previously sampled GPS signals are used to more rapidly determine the current location of a GPS receiver and improve its sensitivity during low signal-to-noise ratio conditions.

One such system is described in U.S. Pat. No. 6,289,041 titled Fast Acquisition, High Sensitivity GPS Receiver by Norman F. Krasner, assigned to SnapTrack Inc, of San Jose, Calif., and incorporated as reference herein in its entirety. In this patent, Krasner describes a system in which a currently sampled GPS signal is accumulated with a previously sampled GPS signal in order to improve the sensitivity and acquisition speed of the receiver. However, the present invention is well suited to utilize a variety of implementations for improving the sensitivity of a GPS receiver during low signal-to-noise ratio conditions.

While embodiments of the present invention can be utilized as a stand alone device, other embodiments of the present invention may utilize other methods for determining the location of an electronic device. For example, many cellular telephone systems are compliant with the E911 standards which seek to improve the quality of wireless 911 service. Phase 1 of the program requires carriers to report the location of the antenna receiving the wireless call. Phase 2 of the program requires carriers to provide much more exact location information (e.g., within 50–100 meters).

One solution for providing Phase 2 level compliance is a server aided location determining system as described in U.S. Pat. No. 6,131,067 titled Client-server Based Remote Locator Device by Richard Girerd and Norman Krasner, assigned to SnapTrack Inc. of San Jose, Calif., and which is incorporated by reference in its entirety herein. In this system, a remote device sends GPS data to a server which processes the data to derive the location of the remote device. The server then transmits the derived location to a client which can display the location of the remote device. In embodiments of Girerd, the remote device can send unprocessed position signals (e.g., GPS satellite signals) to the server which are then processed to derive the location of the remote device.

An example of emerging terrestrial-based technology is described in U.S. patent application Ser. No. 10/159,478 titled Position Location Using Global Positioning Signals Augmented by Broadcast Television Signals by Matthew Rabinowitz and James Spilker, filed May 31, 2002 and assigned to Rosum Corporation of Redwood City, Calif. which is incorporated by reference in its entirety herein. In the above referenced Application, a method and system is described that uses broadcast television signals in conjunction with GPS signals to determine the position of a user terminal.

Another example of emerging terrestrial-based technology is described in U.S. patent application Ser. No. 10/054,302 titled Position Location Using Broadcast Analog Television Signals by Matthew Rabinowitz and James Spilker, filed Jan. 22, 2002 and assigned to Rosum Corporation of Redwood City, Calif. which is incorporated by reference in its entirety herein. In the above referenced Application, a method and system is described that uses a plurality of analog television transmitters as known reference points to determine the location of a user terminal.

In U.S. patent application Ser. No. 09/932,010 titled Position Location Using Terrestrial Digital Video Broadcast Television Signals filed Aug. 17, 2001 and in U.S. patent application Ser. No. 10/054,262 titled Time-gated Delay Lock Loop Tracking of Digital Television Signals filed Jan. 22, 2002 by Matthew Rabinowitz and James Spilker, and assigned to Rosum Corporation of Redwood City, Calif. which are incorporated by reference in their entirety herein. In the above referenced Applications, two methods are described that use a plurality of digital television transmitters as known reference points to determine the location of a user terminal.

Thus, embodiments of the present invention are well suited to enable an electronic device to determine its location on a stand alone basis, or in conjunction with other so-called "aiding" systems. When the electronic device is outside of the coverage area of a wireless communications system, it can still determine its location using embodiments of the present invention.

Figure 2:
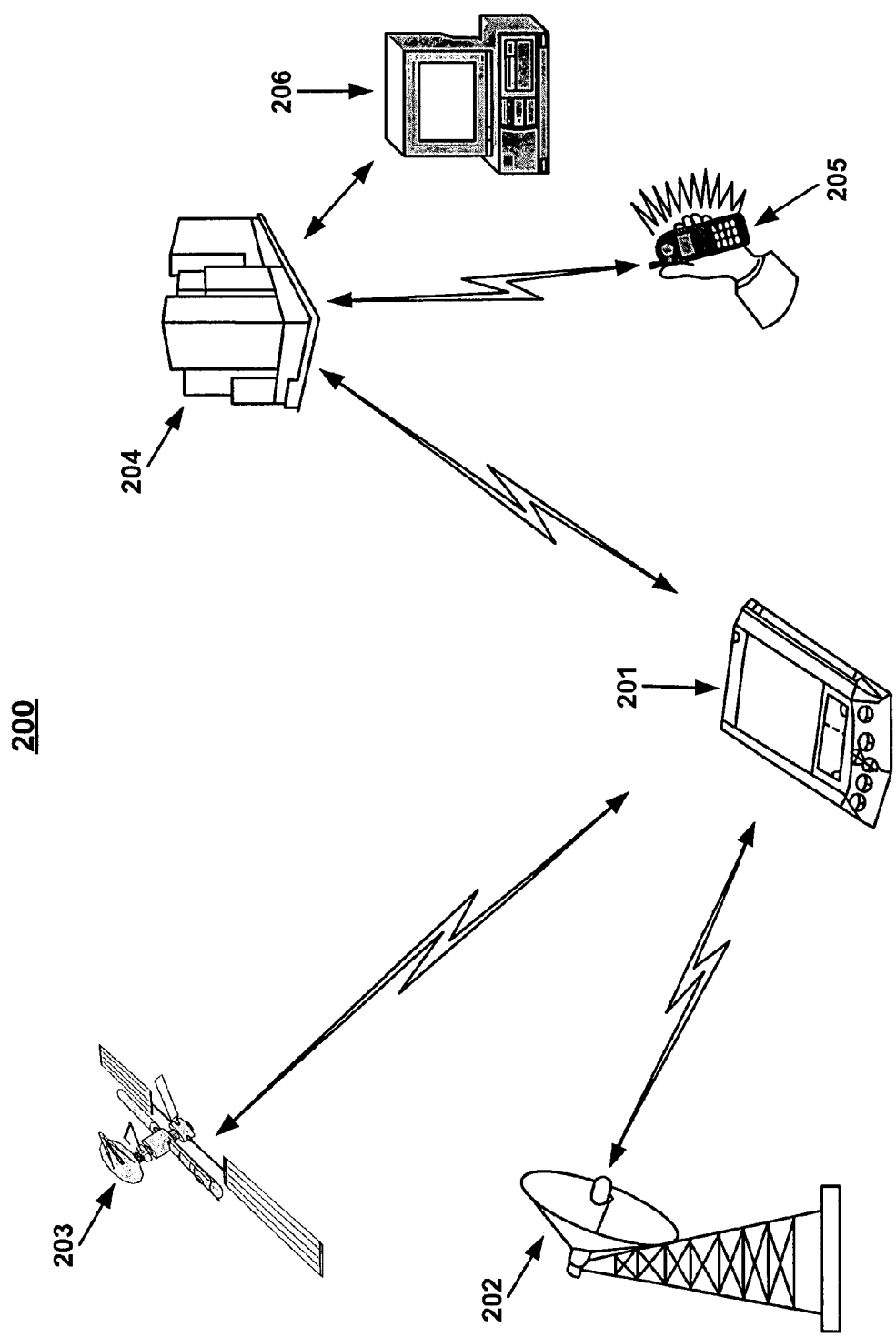
FIG. 2 is a diagram of a position tracking system in accordance with embodiments of the present invention.

FIG. 2 is a diagram of a position tracking system 200 utilized in accordance with embodiments of the present invention. System 200 comprises a electronic device 201 that is coupled with an initiating component 100 (not shown), a position determining system (e.g., position determining system 202 or 203), and a position tracking service provider 204. In the embodiment of FIG. 2, electronic device 201 is capable of wireless communications with service provider 204. When electronic device 201 is moved, initiating component 100 detects the movement, determines its geographic location using position determining system 202 or position determining system 203.

In accordance with embodiments of the present invention, position determining system 202 is a terrestrial-based position determining system. There are a variety of terrestrial-based position determining systems which can be utilized by embodiments of the present invention such as LORAN-C, Decca, radio beacons, etc. Furthermore, the present invention is well suited to utilize future implementations of terrestrial-based position determining systems, e.g., the Rosum positioning technology.

In other embodiments of the present invention, initiating component 100 utilizes a satellite-based position determining system 203 to determine its position. There are a variety of satellite-base position determining systems which can be utilized by embodiments of the present invention such as the Global Positioning System (GPS), Differential GPS (DGPS), Eurofix DGPS, the Global Navigation Satellite System (GLONASS), etc. Furthermore, the present invention is well suited to utilize future implementations of satellite-based position determining systems.

As described above, embodiments of the present invention can determine the location of electronic device 201 and then compare the present location of electronic device 201 with a set of geographic coordinates of a pre-defined zone. Depending upon the relationship between the present location of electronic device 201 and the pre-defined zone, initiating component 100 may generate a command causing electronic device 201 to perform an action. For example, if electronic device 201 is moved from a specified zone without permission, a wireless message may be sent to position tracking service provider 204 as notification. Alternatively, initiating component 100 may cause electronic device 201 to emit an audible alarm until a user enters a security code (using input device 115 of FIG. 1). While the embodiment of FIG. 2 recites using initiating component 100 in conjunction with a position tracking service provider (e.g., position tracking service provider 204 of FIG. 2), the present invention is well suited to being used as a stand alone device. That is, initiating component 100 may be used to control an electronic device without interacting with position tracking service provider 204. For example, a user may simply desire to cause electronic device 201 to perform specific actions depending upon the geographic zone it is in, but not to report to position tracking service provider 204.

Figure 3:
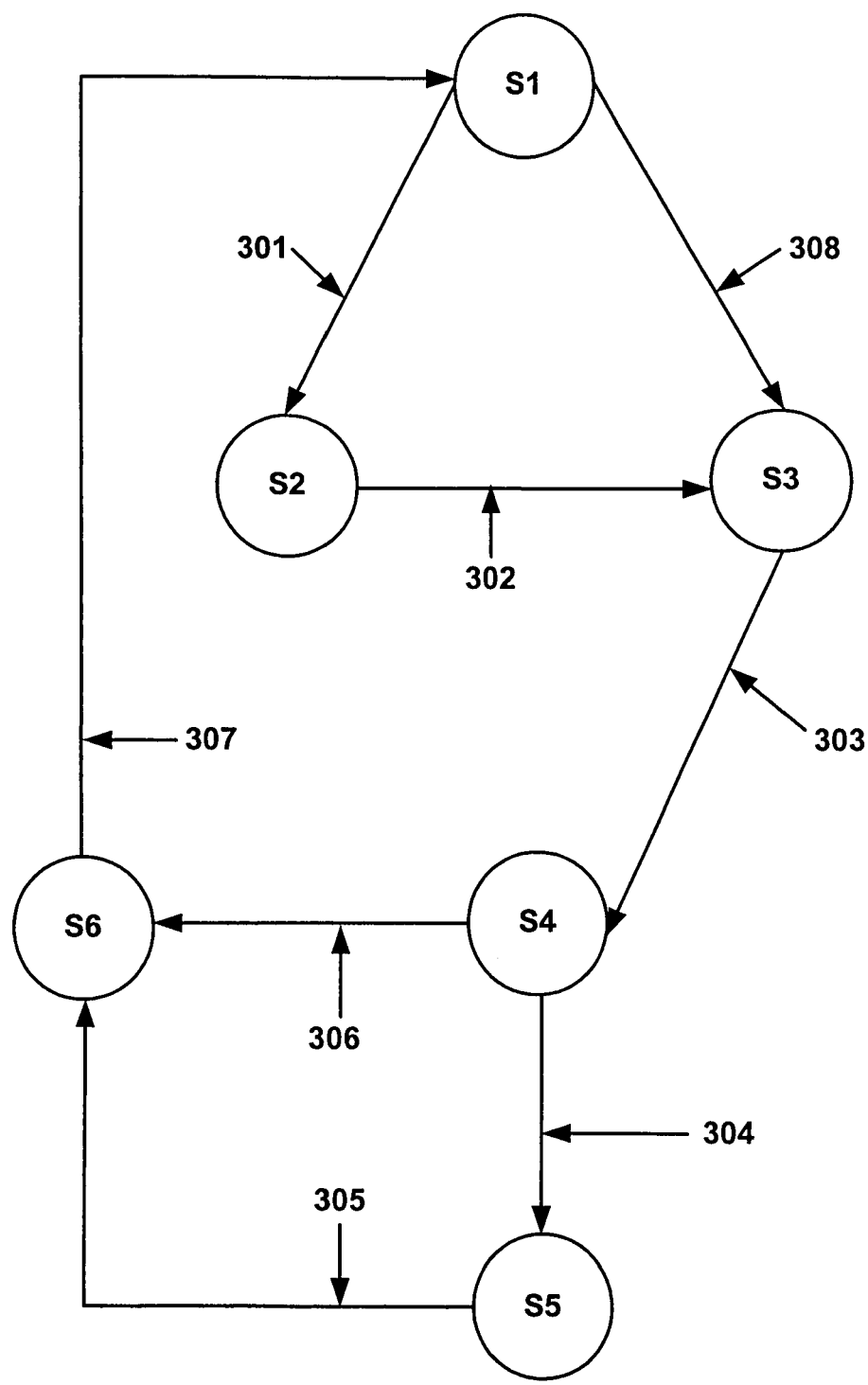
FIG. 3 is a diagram showing the operating states of an initiating component utilized in accordance with embodiments of the present invention.

FIG. 3 is a diagram showing the operating states of initiating component 100 in accordance with embodiments of the present invention. In operating state S1 of FIG. 3, initiating component 100 is in an idle operating state. In embodiments of the present invention, when initiating component 100 is in its idle state the only components drawing power are a real time clock of processor 101 and motion detector 106. This allows initiating component 100 to remain in an operating state in which a minimal amount of power is drawn from the electronic device (e.g., electronic device 201 of FIG. 2) in which initiating component 100 is disposed. In embodiments of the present invention, as little as 10 μA are drawn while initiating component 100 is in idle operating state S1. Because battery drain is minimized in operating state S1, the battery replacement interval for electronic device 201 is thus extended. This is important for many portable electronic devices in which conserving battery life is a critical issue.

At event 301 of FIG. 3 motion detector 106 detects a change of the motion state of electronic device 201 and generates an interrupt to the controller of initiating component 100 (e.g., processor 101 of FIG. 1). The change of motion state may be a starting or stopping of motion, or an acceleration or deceleration of initiating component 100. In response to the interrupt from motion detector 106, processor 101 causes initiating component 100 to transition to operating state S2. Operating state S2 is an active operating state of initiating component 100 in which initiating component 100 will attempt to attain a position fix of its current geographic location using position determining component 106.

When initiating component 100 successfully determines its position within a pre-determined time period, it automatically attempts to send a "fix" message to service provider 204 providing the current time and present geographic location of the device. Initiating component 100 will then continue to periodically determine its position and send that position information to service provider 204 while motion detector 106 detects that initiating component 100 is being moved. This allows service provider 204 to track initiating component 100, and thus the electronic device that initiating component 100 is monitoring, as it is being moved. The time period between position fixes is determined by the pre-determined time period of operating state S6 of FIG. 3.

The pre-determined time period for determining the present location of initiating component 100 can be a default setting, set by the user of initiating component 100, or set by service provider 204. If initiating component 100 can not determine its position within the pre-determined time period, it will automatically initiate transmitting a "no-fix" message to position tracking service provider 204. The no-fix message conveys to service provider 204 that initiating component 100 has detected movement of electronic device 201 and that its position could not be determined using a position determining system (e.g., position determining system 202 or 203) within the pre-determined time period. However, in embodiments of the present invention, the position of initiating component 100 may be checked against the cellular ID sector information contained in the SMS no fix message exchanged with service provider 204 while in operating state S4, or roughly triangulated using a plurality of cellular towers.

In embodiments of the present invention, when initiating component 100 is in operating state S2, processor 101 and position determining component 110 are the only components drawing power. In embodiments of the present invention, current drain during operating state S2 is estimated to be 70 mA while initiating component 100 is determining its location.

At event 302 of FIG. 3, initiating component 100 transitions to operating state S3. In accordance with embodiments of the present invention, initiating component 100 transitions to operating state S3 from operating state S2 after successfully determining its position. Alternatively, initiating component 100 automatically transitions to operating state S3 if a time period 308 expires before motion detector 106 detects movement. Time period 308 can be a default setting, a pre-determined parameter set by the user of initiating component 100, or set by service provider 204.

If initiating component 100 has successfully determined its location using position determining component 110, it then determines what action should be initiated based upon the current time and/or location in operating state S3. For example, a database may be accessed from storage device 105 that describes pre-determined actions to be taken based upon the current time and/or geographic location of initiating component 100. Thus, when electronic device 201 enters a zone defining an airport, the pre-determined action may be to generate a signal to invoke a shut-down routine for electronic device 201. When electronic device 201 leaves the zone defining the airport, initiating component 100 may generate a signal for starting electronic device 201 again.

Additionally, initiating component 100 may be configured to perform different actions depending upon what zone electronic device 201 is currently in. For example, if initiating component 100 is used to control a laptop computer, a user can configure the present invention so that a particular software application (e.g., a spreadsheet application) is initiated when the laptop is brought into the vicinity of the user's workplace and to initiate a different software application (e.g., a Web browser application) when the laptop is brought into the vicinity of the user's home.

As stated above, the action initiated by the present invention may also be determined by the current location in conjunction with the current time. Thus, the present invention may be configured to initiate one action when at a given location at a particular time and to initiate a second action at the same location but at a different time.

Returning now to FIG. 3, at operating state S3, processor 101 determines what action should be taken in response to the current time and/or current location of initiating component 100. Initiating component 100 then generates a command for controlling electronic device 201 based upon the current time and/or geographic location. Additionally, the real time clock of processor 101 may be updated using clock information obtained by position determining component 110 during operating state S2. Additionally, during operating state S3, the operating parameters of initiating component may be checked. For example, the status of battery 117 may be checked to determine if a battery change will be necessary soon. Other parameters may include the length of time period 308, the time interval for successfully determining the present geographic location of initiating component 100 (e.g., during operating state S2). The current software version of initiating device 100 and/or the current version of the database of pre-designated geographic zones, etc.

At event 303 of FIG. 3, initiating component 100 transitions to operating state S4. In operating state S4, initiating component 100 attempts to transmit data to position tracking service provider 204. For example, initiating component 100 may attempt to transmit the current time and geographic location of electronic device 201 to position tracking service provider 204 using wireless communications component 107. Additional information that may be sent includes the type of change in the motion state of initiating component 100. For example, the message may indicate that movement of initiating component 100 has been initiated, or stopped. Alternatively, if a pre-determined time period expires before initiating component 100 successfully determines its position (e.g., during operating state S2), initiating component 100 will transmit a message to service provider 204 conveying that electronic device 201 has been moved but was not able to determine its position using position determining component 110.

Additionally, the fix and no-fix messages may contain additional information such as the battery condition and current operating parameters of electronic device 201. By sending the battery condition information, the present invention reduces the amount of maintenance a user needs to perform to keep electronic device 201 operating properly. For example, position tracking service provider 204 can send a message to the user reminding them to change the batteries in electronic device 201 when it has determined that the batteries are low. In one embodiment of the present invention, a text message can be sent to the user's cell phone 205, or an E-mail message can be sent to the user's home or office computer 206 reminding them to change the batteries in electronic device 201. Additionally, position tracking service provider 204 may determine whether an update of the database of pre-designated geographic zones should be sent to initiating component 100.

In embodiments of the present invention, when service provider 204 receives the position fix message from initiating component 100, it compares the data in the message with a set of pre-defined position parameters set by the user of electronic device 201. If the position of electronic device 201 is outside of the pre-defined position parameters, a message can be sent to the user and/or law enforcement agencies telling them that electronic device 201 has been moved outside of the authorized position parameters. Additionally, service provider 204 can provide the position of electronic device 201 to, for example law enforcement agencies, to assist in recovering the device. Additionally, service provider 204 can change the operating parameters of initiating component 100 during operating state S4 so that position fixes are sent more often in order to assist in recovering the asset which is being monitored. Service provider 204 may also send a command to electronic device 201 causing it to perform a given action. For example, service provider 204 can send a command to electronic device 201 causing it to become inactivated until it is recovered or until a security code is entered. Service provider 204 can also send a command to electronic device 201 causing it to sound an alarm until it is recovered or until a security code is entered.

As an example, when a user first subscribes to the position tracking services of service provider 204 they will be asked if they want to utilize geo-fencing. The user will provide the geographic coordinates of zones of interest for electronic device 201 that specify an area or areas in which electronic device 201 is permitted to move without initiating a warning message to the user and the time periods which electronic device 201 is permitted to be in those areas. The user can also specify an action that is to be initiated by processor 101 if electronic device 201 enters or leaves one of the pre-defined zones. If, for example, electronic device 201 is moved outside of this position or area, service provider 204 contacts the user and/or law enforcement agencies and informs them that unauthorized movement of electronic device 201 has occurred. Service provider 204 may send a text message to the user's cellular telephone 105, an E-mail to the user's computer 106, etc. As described above, service provider 204 may send commands which change the operating parameters of initiating component 100 to cause it to send more frequent position reports when unauthorized movement of the asset is detected to assist in recovering electronic device 201.

Additionally, initiating component 100 can send operating status information during operating state S4. This allows service provider 204 to monitor the battery status of electronic device 201 and inform the user of electronic device 201 when the batteries need to be changed. For example, service provider can send an E-mail or other message to the user of electronic device 201 reminding them to change the batteries of the device when necessary. In embodiments of the present invention, only wireless communications component 107 draws power during operating state S4. It is estimated that in embodiments of the present invention, initiating component 100 draws approximately 400 mA while transmitting its position in operating state S4.

At event 304, initiating component 100 transitions to operating state S5. While in operating state S5, initiating component 100 is in a query state and can receive commands and operating parameters from service provider 204. Additionally, at this time commands can be received for changing the operating parameters of initiating component 100. For example, the time period in which position determining component 110 is allowed to determine the position of initiating component 100 can be changed during operating state S5. Other parameters may include the database defining pre-designated geographic zones for initiating action and/or the action to be taken when entering or leaving one of the pre-designated geographic zones. While the present embodiment recites these parameters specifically, the present invention is well suited for receiving commands for a variety of actions while in operating state S5. In one embodiment, while initiating component 100 is in operating state S5, only wireless communications component 107 draws power. Again, this reduces the amount of power drawn from electronic device 201 and extends the battery life of the device. It is estimated that in embodiments of the present invention initiating component 100 draws approximately 5 mA of power while in operating state S5.

At event 305, when communications with position tracking service provider 204 have completed, initiating component 100 transitions to operating state S6. Alternatively, at event 306, initiating component 100 transitions to operating state S6 if a pre-designated time interval elapses in which initiating component 100 was not able to successfully transmit data during operating state S4.

Operating state S6 is a delay state in which initiating component 100 is forced to remain idle for a pre-determined time period. This sets a time interval between successive position fixes and prevents initiating component 100 from drawing excessive battery power from electronic device 201 in attempting to constantly determine its position while it is being moved. In embodiments of the present invention, initiating component 100 draws as little as 10 µA of power while in operating state S5. The pre-determined time period is an operating parameter which can be a default setting, set by the user of initiating component 100, or by service provider 204 during operating state S5.

The length of the pre-determined time period of operating state S6 can be changed during the query operating state (e.g., operating state S5) as a result of receiving operating parameters from service provider 204. In one embodiment, if service provider 204 determines that unauthorized movement of initiating component 100 is occurring, the length of the time period of operating state S6 can be changed during operating state S5 to cause initiating component 100 to continuously or more frequently send its position to service provider 204. This facilitates locating and recovering the device in which initiating component 100 is disposed. After the pre-determined time period of operating state S6 has expired, initiating component 100 again enters operating state S1 at event 307 at which point initiating component 100 can repeat the process if motion detector 106 detects that electronic device 201 is being moved.

Figure 4:
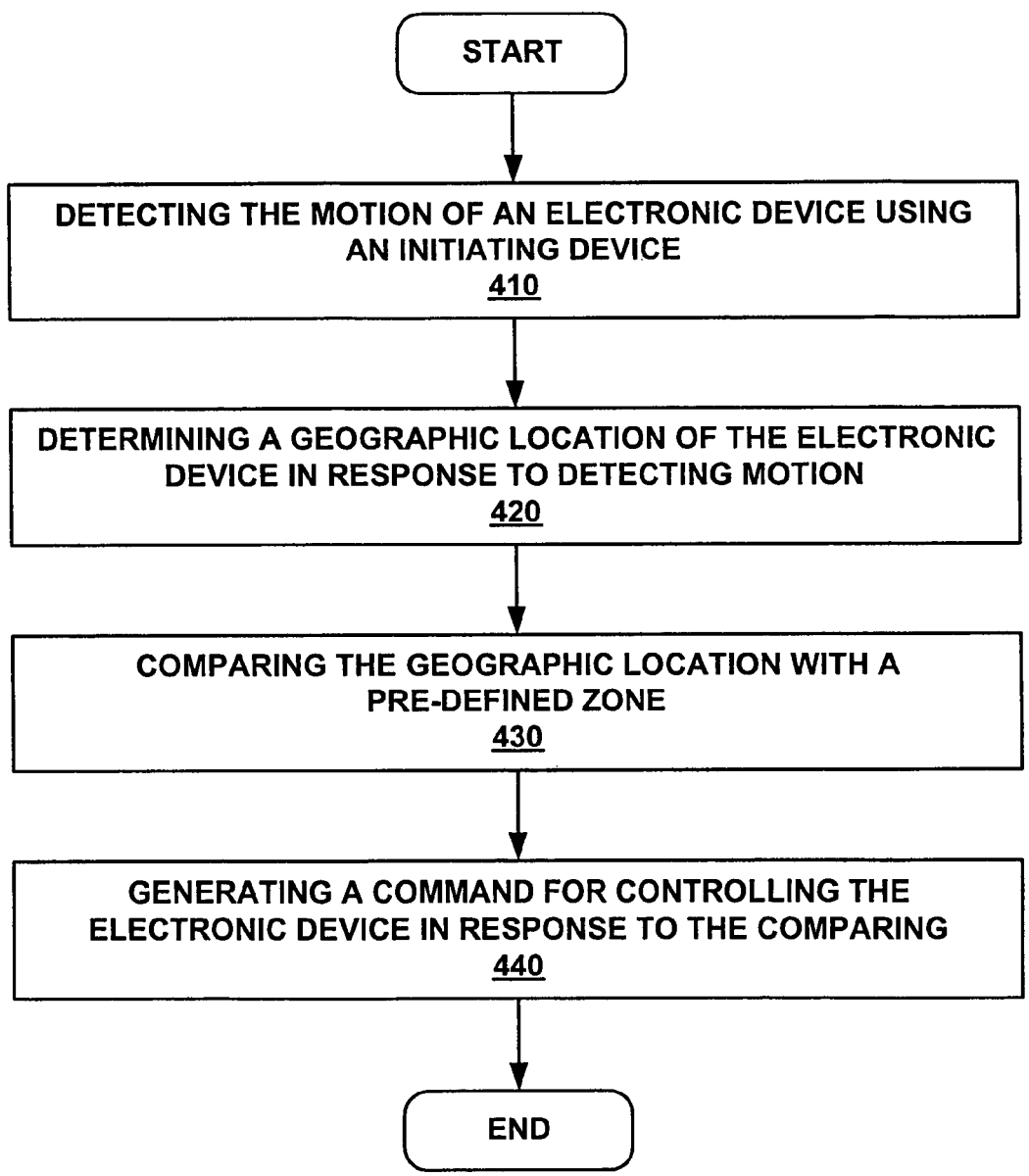
FIG. 4 is a flow chart of a method for controlling an electronic device in accordance with embodiments of the present invention.

FIG. 4 is a flow chart of a method for controlling an electronic device in accordance with embodiments of the present invention. In step 410 of FIG. 4, the motion of an electronic device (e.g., electronic device 201 of FIG. 2) is detected using an initiating device (e.g., initiating component 100 of FIG. 1) that is disposed within the electronic device. According to embodiments of the present invention, a motion detecting component (e.g., motion detector 106 of FIG. 1) is coupled with a controller (e.g., processor 101 of FIG. 1). Motion detector 106 is for detecting changes in the state of motion of initiating component 100. For example, motion detector 106 can detect when initiating component 100 transitions from a substantially stationary state to a moving state. Motion detector 106 can also detect when initiating component 100 transitions from a moving state to a substantially stationary state and/or changes in the rate of movement of initiating component 100.

Coupling an motion detecting component which detects motion with initiating component 100 is a novel method of reducing power consumption for electronic device 201 because it allows initiating component 100 to monitor the location of electronic device 201 while drawing a minimal amount of power when movement has not occurred. In embodiments of the present invention, while initiating component 100 is in an idle operating state, only a real time clock of controller 101 and motion detector 106 are drawing power. Initiating component 100 does not attempt to determine its geographic location unless motion detector 106 detects a change in the motion state of electronic device 201. Thus, the number of position fixes to monitor the location of electronic device 201 are minimized and power consumption is reduced.

In step 420 of FIG. 4, the geographic location of the electronic device is determined in response to detecting its motion. In one embodiment, motion detector 106 detects the vibration associated with the movement of the electronic device in which initiating component 100 is disposed and indicates this movement to processor 101 when changes in motion are detected. In embodiments of the present invention, processor 101 automatically causes a position determining component (e.g., position determining component 110 of FIG. 1) to determine the geographic location of electronic device 201 in response to receiving an interrupt from motion detector 106. In embodiments of the present invention, a terrestrial based or space based position determining system may be utilized to determine the geographic location of electronic device 201. Additionally, the processing of data to determine the geographic location of electronic device 201 may be performed by processor 101 or in conjunction with a remotely located server (e.g., service provider 204 of FIG. 2).

In step 430 of FIG. 4, the geographic location determined in step 420 is compared with a pre-defined zone. In embodiments of the present invention, the present location of electronic device 201 are compared with geographic coordinates that define a zone. These coordinates can be stored in a memory (e.g., storage device 105 of FIG. 1) coupled with processor 101 or stored remotely (e.g., at service provider 204 of FIG. 4).

In step 440 of FIG. 4, a command for controlling the electronic device is generated in response to the comparing. In embodiments of the present invention, depending upon the relationship between the current geographic location of electronic device 201 (as determined in step 420 above) and the geographic coordinates that define a particular zone, a command is generated (e.g., by processor 101) for controlling electronic device 201. Additionally, different commands can generated depending upon the relationship between the current location of electronic device and a particular pre-defined zone. For example, when electronic device 201 is within a given pre-defined zone, a first command is generated for controlling electronic device 201. When electronic device 201 is moved outside of that zone, a different command for controlling electronic device 201 is generated.

Figure 5:
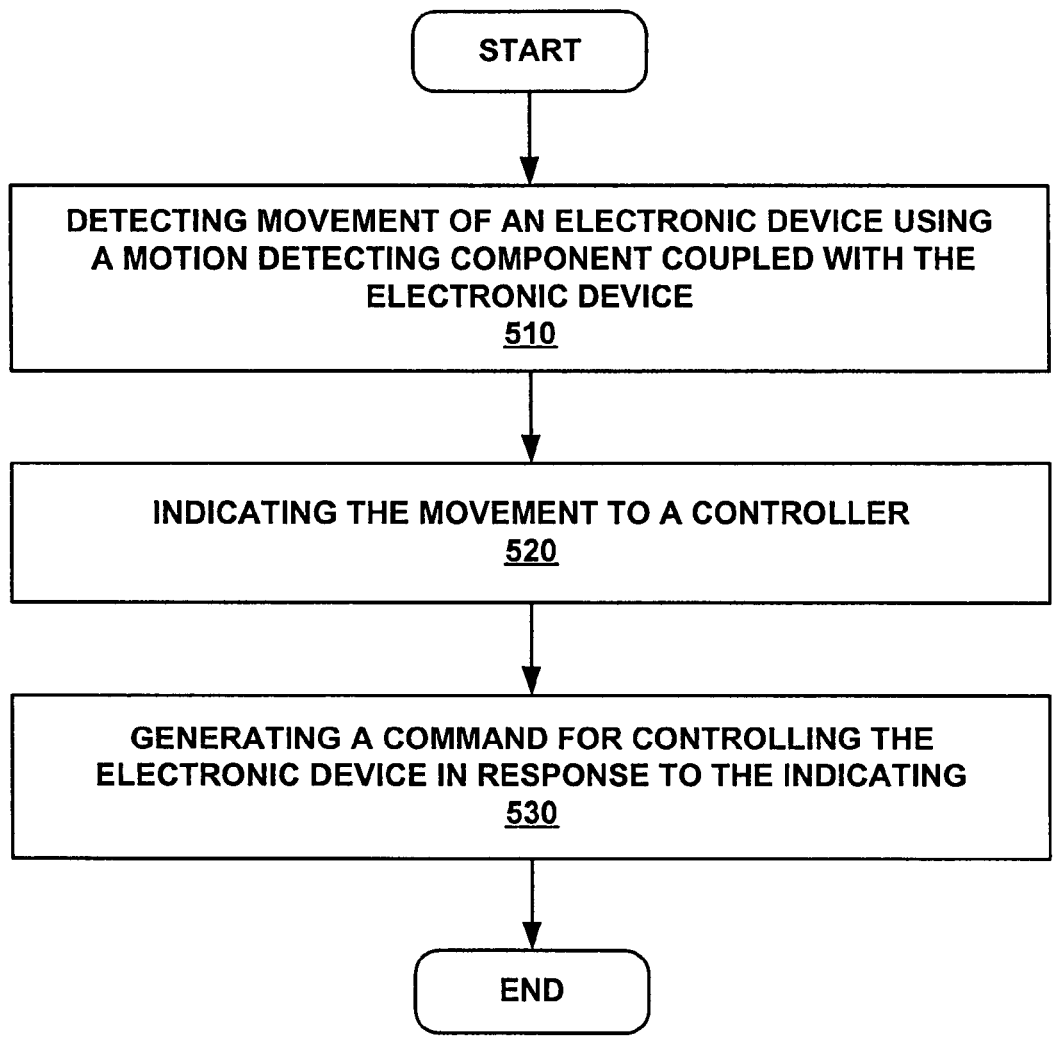
FIG. 5 is a flowchart of a method for controlling power consumption in an electronic device in accordance with embodiments of the present invention.

FIG. 5 is a flowchart of a method for controlling power consumption in an electronic device in accordance with embodiments of the present invention. In step 510 of FIG. 5, movement of an electronic device is detected using a motion detecting component coupled with the electronic device. According to embodiments of the present invention, a motion detecting component (e.g., motion detector 106 of FIG. 1) is coupled with a controller (e.g., processor 101 of FIG. 1) which can be coupled with an electronic device such as a cellular telephone, a portable computer, or an automotive electrical system. Motion detector 106 is for detecting changes in the state of motion of initiating component 100. For example, motion detector 106 can detect when initiating component 100 transitions from a substantially stationary state to a moving state. Motion detector 106 can also detect when initiating component 100 transitions from a moving state to a substantially stationary state and/or changes in the rate of movement of initiating component 100.

Coupling an motion detecting component which detects motion with initiating component 100 is a novel method of reducing power consumption for electronic device 201 because it allows initiating component 100 to monitor the location of electronic device 201 while drawing a minimal amount of power when movement has not occurred. In embodiments of the present invention, while initiating component 100 is in an idle operating state, only a real time clock of controller 101 and motion detector 106 are drawing power. Initiating component 100 does not attempt to determine its geographic location unless motion detector 106 detects a change in the motion state of electronic device 201. Thus, the number of position fixes to monitor the location of electronic device 201 are minimized and power consumption is reduced.

In one embodiment, motion detector 106 detects the vibration associated with the movement of initiating component 100 and indicates this movement to processor 101 when changes in the vibration of initiating component 100 are detected. In other embodiments of the present invention, motion detector 106 may be an acceleration sensor, a tilt sensor, a rotation sensor, a gyroscope, etc.

In step 520 of FIG. 5, the movement is indicated to a controller. In embodiments of the present invention, when motion detector 106 detects movement of initiating component 100, it generates an interrupt signal to processor 101.

In step 530 of FIG. 5, a command for controlling the electronic device is generated in response to the indication. In response to the interrupt signal, processor 101 activates other components of initiating component 100 such as wireless communications component 107 and position determining component 110. The geographic location of initiating component 100 is then determined using position determining component 110. Processor 101 compares the present geographic location with geographic coordinates that define a pre-defined zone. The coordinates of the pre-defined zone may reside in RAM 104 or in storage device 105. Based upon this comparison, processor 101 causes control element 113 to generate a command for controlling the electronic device in which initiating component 100 resides.

Alternatively, processor 101 may generate the command for controlling the electronic device itself. For example, initiating component 100 may be configured to generate a command causing the electronic device to become inactivated when it enters a restricted zone such as an theater, or the gangway leading from the departure lounge to the aircraft while boarding. Since the unit is programmed to operate autonomously to perform this shutdown function, it will work for items which are stored in luggage as well, performing another valuable service by ceasing battery drain while located in an unusable space. When the electronic device moves outside of the restricted zone, processor 101 may generate a signal causing the electronic device to become activated again. This is a great convenience to users who may forget to turn off their electronic devices when they enter a restricted area or to turn them back on when they leave the restricted area.

Thus, embodiments of the present invention, a method and system for controlling an electronic device, are described. While the present invention has been described in particular embodiments, it should be appreciated that the present invention should not be construed as limited by such embodiments, but rather construed according to the following claims.

What is claimed is:

1. A position tracking system comprising:
a position tracking service provider; and
an electronic device coupled with an initiating device, said initiating device comprising:
   a controller;
   a position determining component coupled with said controller; and
   a motion detecting component coupled with said controller wherein said motion detecting component generates an interrupt signal to said controller in response to detecting movement of said electronic device.

2. The position tracking system of claim 1, wherein said controller causes said position determining component to determine said geographic location in response to receiving said interrupt signal.

3. The position tracking system of claim 2, wherein said controller causes said position determining component to determine said geographic location in response to receiving said interrupt signal.

4. The position tracking system of claim 3, wherein said controller generates a command for controlling said electronic device in response to said comparing.

5. The position tracking system of claim 4, wherein said controller uses a current time parameter to determine said command.

6. The position tracking system of claim 2, wherein said position determining component uses a position determining system to determine said geographic location.

7. The position tracking system of claim 6, wherein said position determining system is a satellite-based position determining system.

8. The position tracking system of claim 6, wherein said position determining system is a terrestrial-based position determining system.

9. The position tracking system of claim 1, further comprising a wireless communications component coupled with said controller.

10. The position tracking system of claim 9, wherein said controller automatically causes said wireless communications component to transmit a message conveying said geographic location to said position tracking service provider when said geographic location is determined within a pre-determined time parameter.

11. The position tracking system of claim 10, wherein said controller automatically causes said position determining component to transition to an idle operating state for a pre-determined time period after transmitting said message.

12. The position tracking system of claim 9, wherein said controller automatically causes said wireless communications component to transmit a second message to said position tracking service provider when said geographic location cannot be determined within said pre-determined time period.

13. The position tracking system of claim 9, wherein said controller automatically causes said wireless communications component to transmit a second message to said position tracking service provider when said geographic location cannot be determined within said pre-determined time period.

14. The position tracking system of claim 9, wherein said controller automatically causes said wireless communications component to transmit a third message to said position tracking service provider when said initiating device has not detected movement of said position reporting device within a pre-determined time parameter.

15. The position tracking system of claim 1, wherein said initiating device is disposed within said electronic device.

16. The position tracking system of claim 1, wherein said electronic device is selected from the group comprising a cellular telephone, a portable computer, and an automotive electrical system.

17. An initiating component for an electronic device comprising:
   a controller;
   a motion detecting component coupled with said controller for generating a signal when movement of said electronic device is detected;
   a position determining component coupled with said controller and for determining a geographic location of said electronic device wherein said controller automatically causes said position determining component to determine said geographic location in response to said signal.

18. The initiating component of claim 17, wherein said controller compares said geographic location with a pre-defined zone and generates a command for controlling said electronic device in response to said comparing.

19. The initiating component of claim 18, wherein said controller further uses a current time parameter to determine said command.

20. The initiating component of claim 18 further comprising a wireless communications component coupled with said controller.

21. The initiating component of claim 20, wherein said controller automatically causes said wireless communications component to transmit a message when said geographic location is determined within a pre-determined time parameter.

22. The initiating component of claim 21, wherein said controller causes said motion detecting component to transition to an idle operating state for a pre-determined time period after transmitting said message.

23. The initiating component of claim 20, wherein said controller causes said wireless communications component to transmit a second message when said position determining component cannot determine said geographic location within said pre-determined time parameter.

24. The initiating component of claim 20, wherein said controller automatically causes said wireless communications component to transmit a third message when said motion detecting component does not detect movement of said motion monitoring device within a pre-determined time parameter.

25. The initiating component of claim 19, wherein said motion detecting component is selected from the group comprising an acceleration sensor, a tilt sensor, a vibration sensor, a rotation sensor, a gyroscope, and a motion sensor.

26. The initiating component of claim 17, wherein said electronic device is selected from the group comprising a cellular telephone, a portable computer, and an automotive electrical system.

* * * * *